Figure 1:
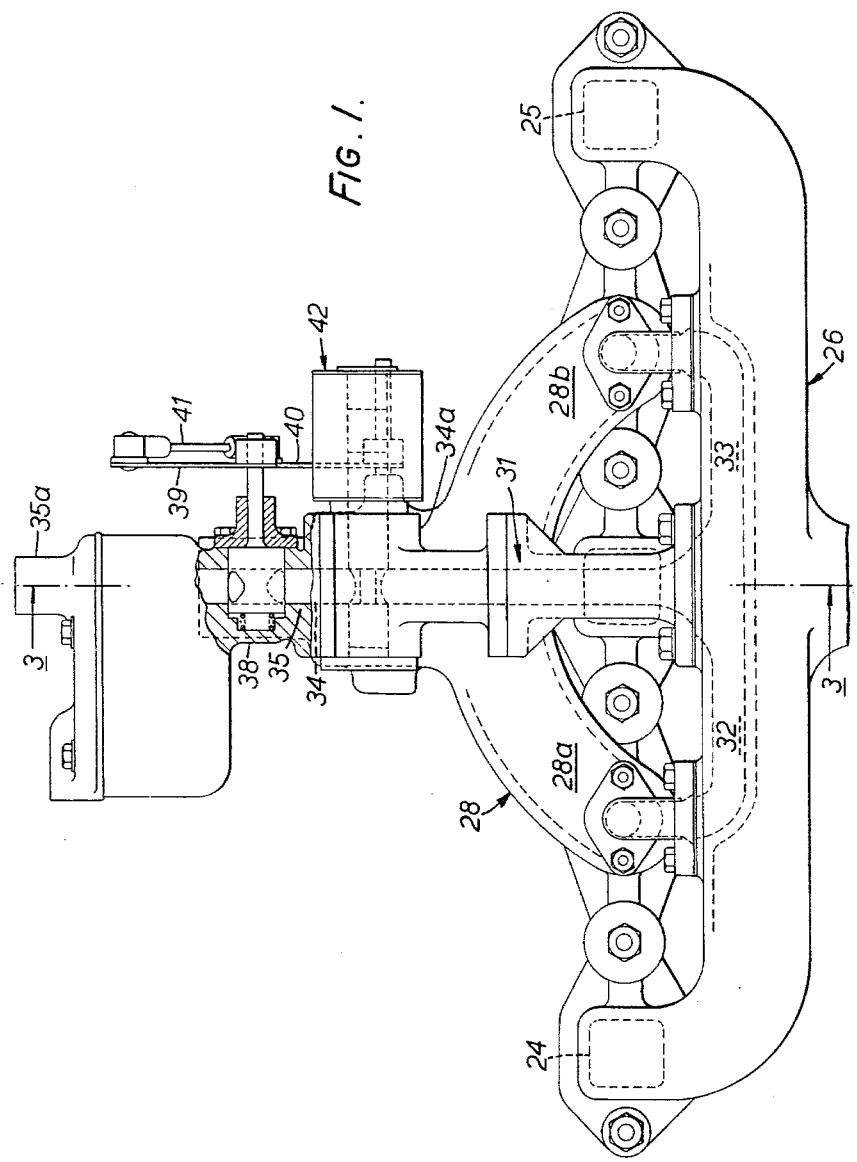

United States Patent Office 3,240,196
Patented Mar. 15, 1966

3,240,196
INTERNAL COMBUSTION ENGINES OF THE VAPORISED CHARGE SPARK IGNITION TYPE
Harry Ralph Ricardo, London, England, assignor to Ricardo & Co., Engineers (1927) Limited, London, England, a company of Great Britain
Filed Oct. 3, 1963, Ser. No. 313,576
Claims priority, application Great Britain, Oct. 4, 1962, 37,633/62
14 Claims. (Cl. 123—97)

This invention relates to internal combustion engines of the vaporised charge spark ignition type (hereinafter for convenience called petrol engines) and is particularly concerned with engines of the kind designed for operation over a wide range of speeds and powers and under conditions in which rapid variations in torque are called for. The invention is thus particularly applicable to petrol engines for transport vehicles and has for one of its principal objects to provide an induction system for such engines which will reduce or substantially prevent pollution of the atmosphere by reason of the exhaust gases discharged to the atmosphere by such engines containing a substantial proportion of fuel in an unburnt or only partially burnt condition.

Many attempts have been made to reduce such pollution of the atmosphere by completing the combustion of unburnt fuel in the exhaust gases of petrol engines in the exhaust systems of such engines, while attempts have also been made to ensure more complete combustion of the fuel within the cylinder or cylinders as by employing a stratified charge part of which is constituted by substantially pure air. These prior proposals have not, however, provided a practicable satisfactory solution to the problem of atmospheric pollution of the kind referred to.

Petrol engines as normally at present made comprise one or more carburettors from which the required fuel-air mixture flows through an inlet "manifold" to the inlet port or ports of the cylinder or cylinders of the engine, the term "manifold" being used herein to include a single induction passage leading to either one or more inlet ports of a cylinder and to a system of passages leading from one or more carburettors to the inlet ports of two or more cylinders.

A carburettor, if correctly adjusted, has been found to be capable of supplying to an induction manifold a mixture containing substantially the correct proportions of fuel and air over a wide range of speed and load conditions, the expression "correct proportions of fuel and air" being used to refer to those proportions which theoretically will provide the appropriate mixture for the load conditions.

With changes in the conditions in an induction manifold, however, with changes in engine operating conditions, part of the fuel from the carburetor tends to be deposited on the interior of the manifold under some conditions and subsequently to evaporate from the interior of the manifold under other conditions, so that, during such deposition, the mixture delivered to the inlet port or ports is weaker than that supplied by the carburetor whereas, during the evaporation process the mixture supplied to the inlet port or ports is richer than that supplied by the carburetor. For example, when a petrol engine is idling, the absolute pressure in the induction manifold is low, usually of the order of 6 to 8 inches of mercury, depending on the compression ratio and/or clearance volume of the engine. Under idling conditions at this low absolute pressure the whole or approximately the whole of the fuel will be vaporised and the inlet port or ports will thus receive a mixture of air and dry vaporised fuel, the internal surface of the manifold remaining dry. When, however, the throttle is opened so that the pressure in the manifold rises suddenly, say from about 6 inches of mercury to 29 inches of mercury, the fuel delivered by the carburetor will be largely in the liquid phase and a considerable proportion of this liquid becomes deposited on the walls of the manifold, this deposition continuing until a stable condition of "wetness" of the walls of the manifold has been achieved. During this period of deposition, therefore, although the carburetor is delivering fuel and air in the correct proportion, a substantial proportion of the fuel fails to reach the inlet port or ports so that the mixture delivered to the inlet port or ports is weak. In order, therefore, to prevent the engine failing or hesitating to accelerate under these conditions, it is necessary and customary to provide means by which the carburetor is caused to supply a very rich mixture when the throttle is suddenly opened, the usual form of these means being what has become known as "an accelerator pump," that is to say a pump actuated by the throttle lever and arranged to supply the extra fuel needed to wet the surface of the induction manifold when the throttle is suddenly opened. Such a device, however, only provides a compromise since it cannot cater for the widely different conditions of manifold temperature and/or fuel volatility which are experienced in operation. Moreover if, as it must be to be acceptable in practice, it is designed to deal with the most unfavourable condition, i.e. the condition in which most rapid deposition on the induction manifold wall tends to occur, it will provide an over-rich mixture resulting in delivery of a substantial excess of fuel to the inlet port or ports under less unfavourable conditions.

Further, considering now the condition which occurs when, after a period of acceleration, the throttle is closed, e.g. to the idling position, all the liquid fuel which was deposited on the wall of the induction manifold during the acceleration period now evaporates so that the inlet port or ports then receive an excessively rich mixture until that evaporation is complete.

Finally, under over-running conditions, that is to say under conditions when the throttle occupies the idling position or is only slightly open and the engine is running relatively fast due to its own momentum or the fact that the load which it is arranged to drive is applying torque to it, the charge entering the cylinder or cylinders from the induction manifold is so attenuated and the combustion so slow that much of the charge is discharged into the exhaust pipe or pipes unburnt or only partially burnt.

Even, therefore, if the carburettor is adjusted to give a correct mixture at all loads when operating under stable conditions (as on a test bed) yet under conditions of alternating acceleration and deceleration the proportion of fuel to air in the mixture actually passing through the inlet port or ports varies substantially.

When a road vehicle is operating in city traffic or similar conditions involving rapid accelerations from stationary or slow speed conditions and rapid decelerations, often passing from one extreme to the other every few seconds, it will be apparent, therefore, that for a substantial proportion of its working period, even with a perfectly adjusted carburettor or carburettors, substantial proportions of unburnt or only partly burnt fuel will be present in the exhaust gases discharged into the atmosphere, and it is thought that this is one of the reasons why properly adjusted engines of the liquid fuel injection compression ignition type when used on vehicles in urban service show advantages over petrol engines as regards atmospheric pollution greater than a comparison of test bed figures would suggest.

Proposals have been made to provide heating by the exhaust gases from the engine of the induction manifold and/or of the air, with a view to preventing accumulation on the induction manifold walls of liquid fuel. If sufficient heat is provided, however, to ensure that all the fuel is vaporized under all running conditions, this reduces very considerably the maximum output of the engine, due to the great reduction in the maximum weight of charge which the engine will receive, while also substantially increasing the tendency for detonation to occur in the engine, the reduction in performance and the increase in tendency to detonate being such in fact as will not be tolerated by users of such engines.

According to the present invention an induction system for an internal combustion engine of the vaporised charge spark ignition type comprises a fuel and air manifold connected to a carburbettor constructed and arranged to provide a fuel-air mixture containing a substantial excess of fuel, means by which a part at least of said fuel and air manifold will be highly heated by exhaust products during operation of the engine, a substantially unheated air manifold arranged to receive air from the atmosphere without admixture with fuel, the two manifolds being arranged to deliver respectively the said fuel and air mixture and air to the passage or passages leading to the inlet port or ports of the engine at a point or points adjacent to such port or ports, and throttle means (herein called for convenience main throttles) arranged to control the fluid flow through the two manifolds simultaneously in predetermined relationship.

The proportions of the mixture delivered to the inlet port or ports and drawn respectively from the fuel and air manifold and the air manifold, may vary considerably but in a typical example approximately 90% of the total air may be passed through the air manifold while the remaining 10% passes with the fuel (so as to constitute therewith a very rich carburetted mixture) through the highly heated fuel and air manifold.

The heating of the fuel and air manifold can be effected conveniently by exhaust jacketing in a manner well known per se, and the arrangement must be such in any case as to ensure that under normal operating conditions any liquid fuel which tends to deposit upon the wall of the manifold is immediately vaporised by heat derived from the exhaust gases. This involves heating the fuel and air manifold to such an extent that the carburetted mixture will be heated to a temperature of substantially over 100°C.

The two manifolds not only communicate with one another at the point or points adjacent to the inlet port or ports of the cylinder or cylinders, but the air inlet to the carburettor and the end of the air manifold remote from the inlet port or ports preferably draw air from a common chamber, e.g. a common air cleaner, so that under all conditions the pressures respectively at the air inlet to the carburettor and at the outlet or outlets from the fuel and air manifold will be the same as the pressures respectively at the inlet and outlet ends of the air manifold.

Conveniently in addition the main throttles controlling the flow respectively through the air and fuel manifold and the air manifold are of the same geometric form, although of different size, so as to ensure the maintenance of a substantially constant ratio between the volumetric rates of flow respectively through the two manifolds at all throttle openings. Means may also be provided for adjusting the overall mixture strength by adjusting the phase relationship of the two throttles. Conveniently barrel type throttle valves are employed in order to ensure as far as possible the desired geometrical similarity and hence the substantially constant flow ratio particularly at the smaller openings of the valves.

It will be appreciated that the carburetor would not be provided with any accelerator pump or the equivalent but might otherwise be of conventional type, although, as will be understood, of substantially smaller size for an engine of given cylinder capacity than that required for a normal petrol engine as at present made.

With constructions according to the invention, in order to achieve satisfactory steady idling of the engine it may be necessary, as in known arrangements, to provide a setting such that under idling conditions the engine receives a somewhat over-rich mixture.

Fuel cut off means may also be provided in accordance with a further feature of the invention by which under over-running conditions the supply of fuel to the engine is cut off or substantially cut off as by means of a separate throttle valve (herein called the fuel cut off throttle) situated in the induction manifold between the carburettor and the inlet port or ports. Such fuel cut off means may be arranged to be operated by apparatus sensitive to the difference in the pressure in the induction manifold respectively under idling and over-running conditions, or by apparatus sensitive jointly to the speed of the engine and the positions of the main throttles so that only when the engine is operating above a predetermined speed with the main throttles substantially closed with the fuel cut off means cut off the fuel supply. The speed responsive device in the latter arrangement may be centrifugally operated but preferably is an electrical device coupled to a generator driven by the engine. In any case the fuel cut off throttle valve is conveniently arranged to be actuated by a solenoid, either directly or through a pneumatic or other relay.

Figure 2:
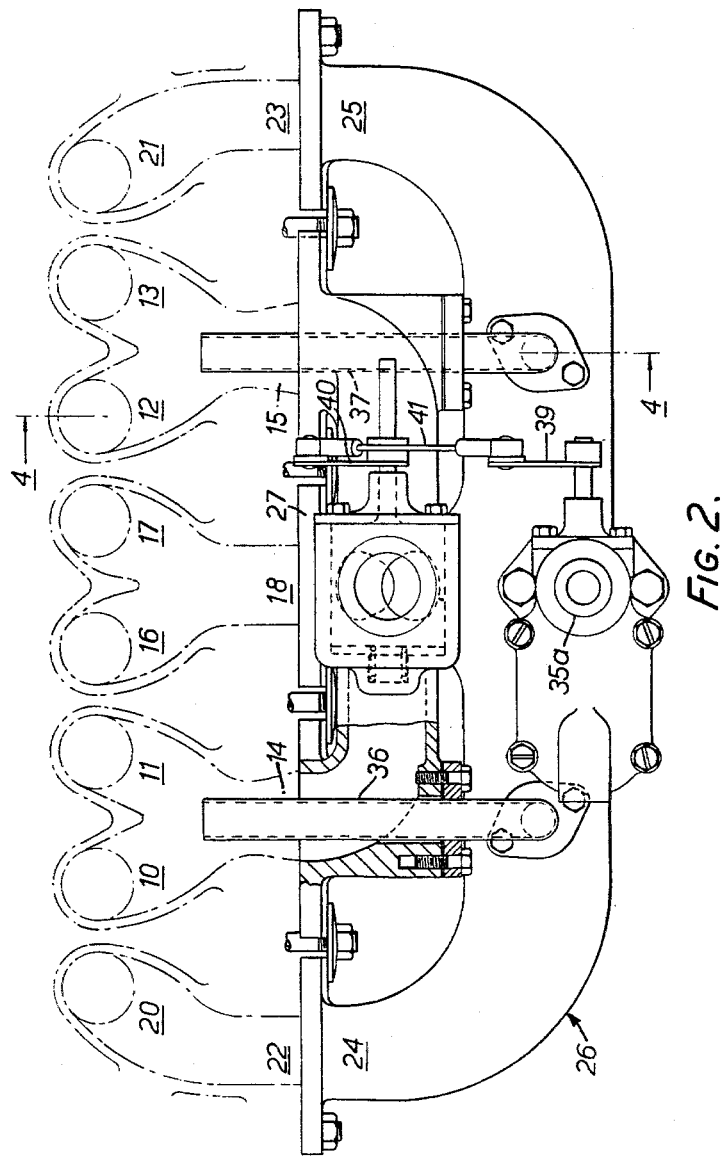
Figure 3:
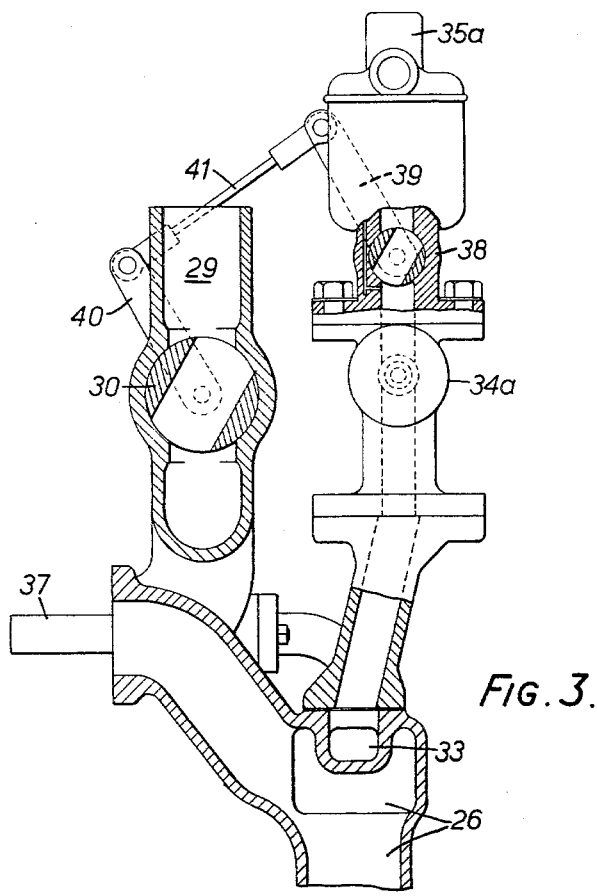
Figure 4:
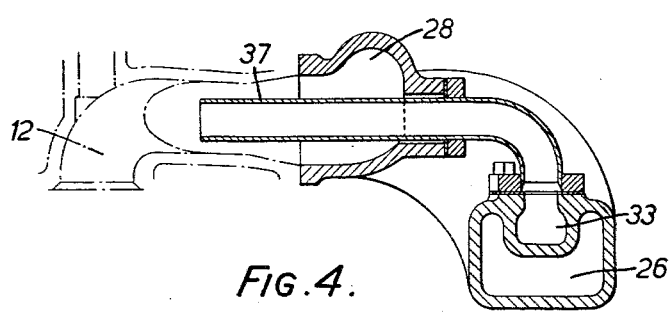
Figure 5:
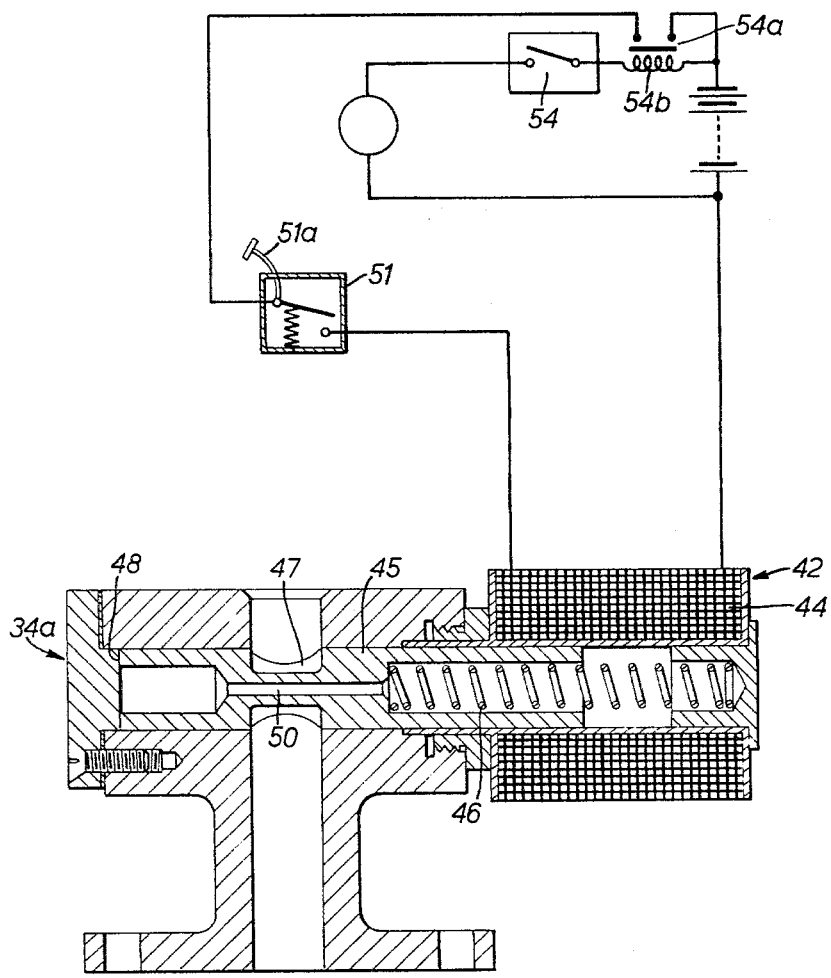
Figure 6:
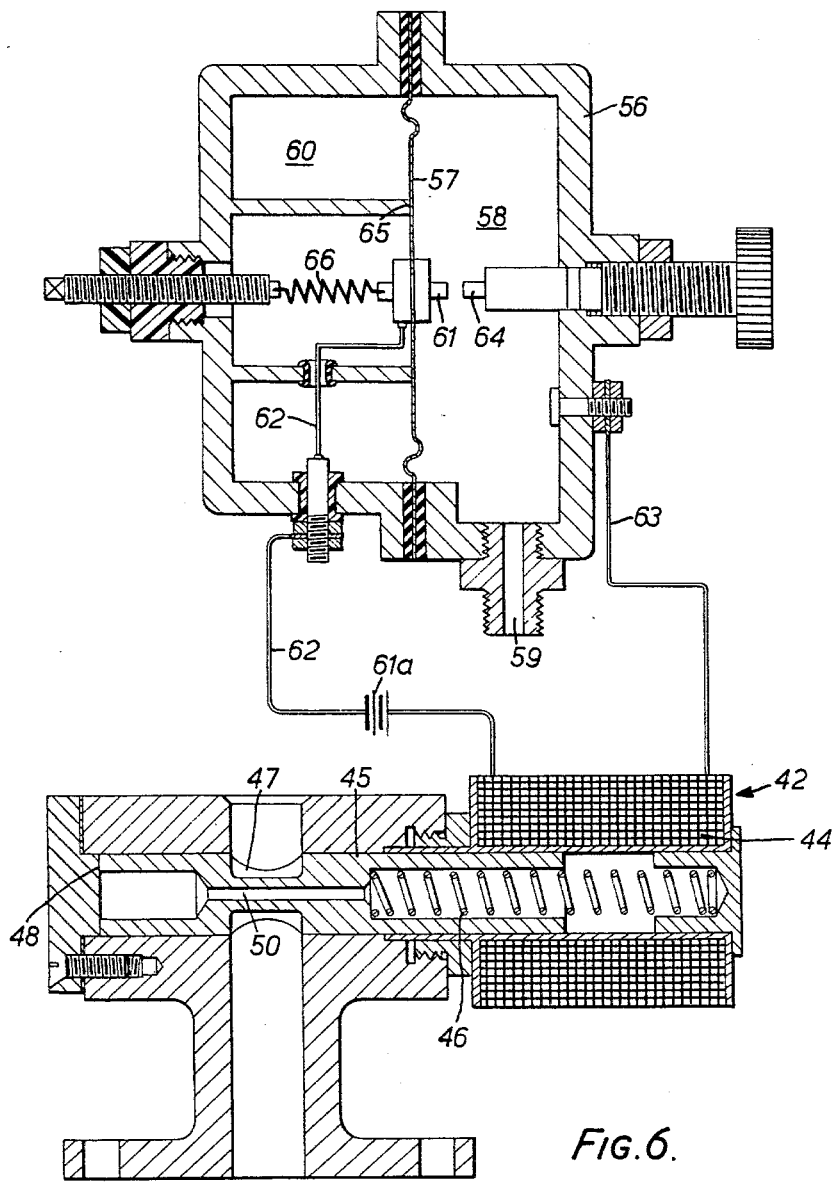

The invention may be carried into practice in various ways but one specific embodiment will now be described by way of example with reference to the accompanying drawings, in which:

FIGURE 1 is a side elevation of an induction system for an internal combustion engine according to the present invention, FIGURE 2 is a plan view of the system of FIGURE 1 partly in section, FIGURE 3 is a cross-section taken on the line 3—3 of FIGURE 1, FIGURE 4 is a cross-section taken on the line 4—4 of FIGURE 2, FIGURE 5 is a diagrammatic representation on an enlarged scale of one arrangement for cutting off the fuel supply when the engine is over-running, and FIGURE 6 is a diagrammatic representation also on an enlarged scale of an alternative arrangement for cutting off the fuel supply when the engine is over-running.

The induction system shown in FIGURES 1 to 4 is suitable for a four-cylinder petrol engine of conventional type in which the cylinder and cylinder head casting has inlet and exhaust passages arranged for connection to inlet and exhaust manifolds situated on the same side of the engine. The inlet ports 10, 11, 12, 13 of the pair of cylinders at each end of the assembly communicate with common inlet passages 14, 15 while the two central exhaust ports 16 and 17 communicate also with a single exhaust passage 18, the exhaust ports 20, 21 of the outer two cylinders having separate exhaust passages 22, 23. The outer exhaust passages 22, 23 communicate with outer branches 24, 25 of a common exhaust manifold indicated generally at 26, while the central common exhaust passage 18 communicates with the central branch 27 of the exhaust manifold.

As shown in FIGURE 1, an air inlet manifold 28 of generally U-shape is arranged so that the ends of the two arms 28a and 28b of the U communicate directly with the outer ends of the two inlet passages 14, 15 while it has an air inlet opening 29 controlled by a throttle valve 30 of the barrel type.

A fuel and air inlet manifold 31 has two branches 32 and 33 leading from the outlet 34 of a small carburettor 35 having an air inlet 35a the two branches extending through a portion of the exhaust manifold so as to be highly heated as shown in FIGURES 1 and 3, and thence through the inlet manifold, as shown in FIGURES 2 and 4, by means of copper tubes 36 and 37 to points adjacent the inlet ports.

The throttle valve 38 of the carburettor is also of the barrel type and is linked to the throttle valve 30 in the air inlet by arms 39, 40, connected respectively to the throttle valves and connected together by an adjustable linkage 41 so that their relative positions can be adjusted.

The air inlets 35a and 29 to the carburettor and the throttle-controlled air manifold 28 would normally communicate with a common air cleaner (not shown).

The outlet 34 includes an intermediate connecting piece 34a incorporating fuel cut off means as hereinafter more fully described with reference to FIGURE 5 or FIGURE 6.

In the arrangement as diagrammatically shown in FIGURE 5 for cutting off the supply of fuel to the engine when the engine is over-running, the connecting piece 34a is provided with a solenoid-operated fuel cut off throttle valve indicated generally at 42 shown in the open position. The valve is operated by a solenoid coil 44 in which is arranged to slide a plunger 45 biassed by means of a spring 46 in its hollow interior towards the open position. Formed integrally with the plunger 45 is a valve 47 controlling the flow of air fuel mixture through the outlet 34. The lefthand end of the plunger 45 which is also hollow rests against an adjustable stop 48 in the open position by which the normal position of the valve 47 can be adjusted. A passage 50 joins the two hollow ends of the plunger 45, so that when the valve is moved from one position to the other, the air thereby displaced does not impede the operation of the valve.

The valve 47 is arranged to be closed by energisation of the solenoid only when a switch 51 connected to the accelerator pedal 51a of the car, is closed and a relay switch 54a is also closed. The switch 51 is closed only when the accelerator pedal is in the "idling" position while the switch 54a is closed by its operating coil 54b only when a cut out switch 54 arranged in conventional manner in the circuit of a battery 52 a generator 53 device by the engine is closed. Only therefore when the engine speed is above that at which the cut out switch 54 is closed and the accelerator is in the "idling" position will the solenoid 44 be energised to close the fuel cut off throttle valve 47. It will be understood that the idling speed is set so that it is lower than the speed at which the cut-out operates so that under "idling" conditions (as opposed to over running conditions) the valve 46 will remain open.

In the alternative construction for cutting off the fuel supply on the over-run as shown in FIGURE 6 the same solenoid valve 42 as before is incorporated in the connecting piece 34a but in this construciton the solenoid is arranged to be energised by a pressure responsive switch device arranged to be responsive to the pressure in the inlet manifold. The pressure-responsive device comprises a casing 56 which is divided into two chambers by a flexible diaphragm 57 the righthand chamber 58 of which is in communication via a passage 59 with the inlet manifold while the lefthand chamber 60 is subject to atmospheric pressure. Attached to the diaphragm is a contact 61 connected via a connection 62 to one side of a battery 61a the other side of the battery being connected to one terminal of the solenoid coil while the connection to the other terminal of the solenoid coil is via a connection 63 connected to an adjustable contact 64. The contact 61 is normally held against a stop 65 by means of a spring 66 having a screw adjustment 66a.

The spring 66 is adjusted so that the diaphragm is held exactly in contact with a stop 65 when the engine is idling but moves on the over-run away to the right on reduction in pressure inlet manifold.

The adjustable contact 64 is adjusted so that it is only a small distance away from the movable contact 61 when the diaphragm rests on the stop 65 so that when the diaphragm moves out of contact with this stop from the position shown in FIGURE 6 the contact 61 makes contact with the contact 64 thus completing the circuit to operate the solenoid valve 42 as before, to cut off the fuel supply to the engine, and when the engine returns to the idling condition the depression in the inlet manifold rises and the spring 66 reopens the contacts 61, 64 to cut off the current to the solenoid, which then reopens the valve 42.

In an alternative construtcion (not shown) a centrifugally operated switch may replace the switch 54 in the arrangement shown in FIGURE 5.

It will be understood that in some arrangements according to the invention there may be two or more carburettors arranged to supply the fuel and air mixture in association with a single air inlet manifold or two or more air inlet manifolds feeding different cylinders or sets of cylinders.

What I claim as my invention and desire to secure by Letters Patent is:

1. An induction system for an internal combustion engine of the vaporised charge spark ignition type, including a piston disposed for reciprocation in a cylinder formed with an inlet port, comprising a fuel and air manifold connected to a carburetor construction and arranged to provide a fuel/air mixture containing a substantially higher proportion of fuel than is necessary during normal operation of said engine, means by which a part at least of said fuel and air manifold will be highly heated by exhaust products of the engine during its operation, a substantially unheated air manifold communicating with and arranged to receive air directly from the atmosphere, the two manifolds communicating with each other and with said inlet port at a point adjacent said port, to deliver respectively the said fuel and air mixture to the inlet port, and "main" throttles respectively arranged to control the fluid flow through the two manifolds simultaneously in predetermined relationship.

2. An induction system as claimed in claim 1, in which said carburetor and said air manifold both have air inlets communicating with and drawing air from a common chamber so that under all conditions the pressures respectively at the air inlet of the carburetor and the outlet or outlets from the fuel and air manifold will be the same as the pressures respectively at the inlet and outlet ends of the air manifold.

3. An induction system as claimed in claim 2, in which the said throttles controlling the flow respectively through the air and fuel manifold and through the air manifold are of the same geometric form, although of different size, so as to ensure the maintenance of a substantially constant ratio between the volumetric rates of flow respectively through the two manifolds at all throttle openings.

4. An induction system as claimed in claim 3, in which means are provided for adjusting the over-all mixture strength by adjusting the phase relationship of the two throttles.

5. An induction system as claimed in claim 3, in which said throttles both comprise barrel type throttle valves.

6. An induction system as claimed in claim 1, in which means are provided for substantially discontinuing the fuel supply to the engine under over-running conditions.

7. An induction system as claimed in claim 6, in which the means by which the supply of fuel is substantially discontinued during over-running conditions comprises apparatus sensitive to increased depression in the induction system during over-running conditions as compared with the depression under idling conditions.

8. An induction system as claimed in claim 6, in which the said means for substantially discontinuing the supply of fuel comprises apparatus brought into operation on the over-run and sensitive jointly to the positions of the said throttles and to the speed of the engine.

9. An induction system as claimed in claim 8, in which said last-mentioned apparatus is centrifugally operated.

10. An induction system as claimed in claim 8, in which the said apparatus comprises a switch sensitive to the output of a generator driven by the engine.

11. An induction system as claimed in claim 10, in which the said apparatus includes a switch arranged to be closed when the main throttles are closed.

12. An induction system as claimed in claim 6, in which the means for substantially discontinuing the supply of fuel to the engine is a separate fuel cut off throttle valve situated in the induction manifold between the carburetor and the inlet port.

13. An induction system as claimed in claim 12, including a solenoid for actuating the fuel cut off throttle valve.

14. An induction system as claimed in claim 13, in which the fuel cut off throttle valve is spring biassed towards the open position.

References Cited by the Examiner
UNITED STATES PATENTS

| | | | |
|---|---|---|---|
| 1,727,265 | 9/1929 | Aseltine | 123—52 |
| 1,834,198 | 12/1931 | Aseltine | 123—119 |
| 1,905,258 | 4/1933 | Williams | 123—119 X |
| 1,926,019 | 9/1933 | Aseltine | 123—52 |
| 1,926,020 | 9/1933 | Aseltine | 123—119 |
| 2,011,993 | 8/1935 | Aseltine | 123—119 |
| 2,082,666 | 6/1937 | Ulrich | 123—52 |
| 2,084,426 | 6/1937 | Berry | 123—119 |
| 2,124,081 | 7/1938 | Rauen et al. | 123—97 |
| 2,185,573 | 1/1940 | Spindler | 123—133 |
| 2,282,458 | 5/1942 | Conover | 123—119 |
| 2,415,336 | 2/1947 | Carlson | 123—119 |
| 2,727,502 | 12/1955 | Grill et al. | 123—52 |
| 2,733,696 | 2/1956 | Schneider | 123—97 |
| 2,853,064 | 9/1959 | Karrasch | 123—97 |

MARK NEWMAN, *Primary Examiner.*

LAURENCE M. GOODRIDGE, *Examiner.*